(12) United States Patent
Kirn et al.

(10) Patent No.: US 7,458,030 B2
(45) Date of Patent: Nov. 25, 2008

(54) SYSTEM AND METHOD FOR REALTIME MESSAGING HAVING IMAGE SHARING FEATURE

(75) Inventors: Kevin Neil Kirn, Seattle, WA (US); Gregory Alan Marks, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/733,763

(22) Filed: Dec. 12, 2003

(65) Prior Publication Data

US 2005/0132288 A1 Jun. 16, 2005

(51) Int. Cl.
G06F 3/00 (2006.01)
G06F 15/16 (2006.01)

(52) U.S. Cl. .............. 715/751; 715/733; 715/753; 715/758; 715/835; 715/838; 715/205

(58) Field of Classification Search ......... 715/716–719, 715/727, 730, 732, 733, 738, 744, 748, 751–753, 715/755–759, 764, 780, 838, 846, 781, 201, 715/205

See application file for complete search history.

(56) References Cited

U.S. PATENT DOCUMENTS

| | | | | |
|---|---|---|---|---|
| 6,029,191 | A * | 2/2000 | Kurashima | 709/205 |
| 6,072,479 | A * | 6/2000 | Ogawa | 707/104.1 |
| 6,263,505 | B1 * | 7/2001 | Walker et al. | 725/110 |
| 6,674,881 | B2 * | 1/2004 | Bacus et al. | 382/128 |
| 6,674,992 | B2 * | 1/2004 | Helmick et al. | 434/362 |
| 6,785,708 | B1 * | 8/2004 | Busey et al. | 709/204 |
| 6,996,782 | B2 * | 2/2006 | Parker et al. | 715/764 |
| 7,003,728 | B2 * | 2/2006 | Berque | 715/753 |
| 2001/0037367 | A1 * | 11/2001 | Iyer | 709/204 |
| 2002/0093980 | A1 * | 7/2002 | Trebes, Jr. | 370/466 |
| 2002/0113813 | A1 * | 8/2002 | Yoshimine | 345/723 |
| 2002/0126135 | A1 * | 9/2002 | Ball et al. | 345/600 |

(Continued)

OTHER PUBLICATIONS

Y. Furui et al, "A chalkboard for asymetric collaboration", Nov. 11-14, 1996, Robot and Human Communications, 1996, 5th IEEE International Workshop on, pp. 531-536.*

(Continued)

*Primary Examiner*—X. L Bautista
(74) *Attorney, Agent, or Firm*—Shook, Hardy & Bacon, L.L.P.

(57) ABSTRACT

A system and related methods permit a group of two or more users to initiate a realtime message session online, and invite participants to transmit and share digital images and other media to a common viewer tool seen by all. The messaging session may be conducted via a message server which mediates the exchange of typed, spoken or other messages back and forth amongst participants. One or more users may assume control of the commonly displayed images, for instance in a slideshow or other viewer tool. Users can discuss the displayed images or other media in realtime. The participants may each view, save, store, print or otherwise use or manipulate the copy of the image or images as presented to them. Session control of the set of displayed images may be passed from one user to another on a voluntary basis, using for example a control token or other mechanism. In embodiments shared control may be used. Out-of-order rendering and other optimizations may enhance the response time to participating viewers.

38 Claims, 5 Drawing Sheets

U.S. PATENT DOCUMENTS

| | | |
|---|---|---|
| 2002/0129106 A1* | 9/2002 | Gutfreund .................. 709/205 |
| 2002/0130904 A1* | 9/2002 | Becker et al. ............... 345/753 |
| 2003/0074404 A1* | 4/2003 | Parker et al. ................ 709/204 |
| 2003/0078969 A1* | 4/2003 | Sprague et al. |
| 2003/0191816 A1* | 10/2003 | Landress et al. ............ 709/219 |
| 2003/0234953 A1* | 12/2003 | Dawson et al. ............. 358/1.15 |
| 2003/0236832 A1* | 12/2003 | McIntyre et al. ............ 709/204 |
| 2004/0044723 A1* | 3/2004 | Bell et al. ................... 709/203 |
| 2004/0064704 A1* | 4/2004 | Rahman ..................... 713/182 |
| 2004/0177116 A1* | 9/2004 | McConn et al. ............. 709/204 |
| 2004/0267746 A1* | 12/2004 | Marcjan et al. ................ 707/8 |
| 2005/0052685 A1* | 3/2005 | Herf et al. .................. 358/1.15 |
| 2005/0108769 A1* | 5/2005 | Arnold et al. ............... 725/115 |
| 2005/0210395 A1* | 9/2005 | Wakita et al. |

OTHER PUBLICATIONS

International Search Report for related International Application No. PCT/US04/24692 dated Dec. 22, 2004.

* cited by examiner

SYSTEM AND METHOD FOR REALTIME MESSAGING HAVING IMAGE SHARING FEATURE

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The invention relates to the field of communications, and more particularly to a platform and techniques for initiating and conducting a realtime communications session, such as a realtime typed-messaging session, in which images or other media are shared between users in an integrated display under control of one or more of the message session participants.

BACKGROUND OF THE INVENTION

Internet-based messaging platforms have increased in popularity and use in recent years. That class of services often features a realtime messaging channel in which users may mutually view typed messages in realtime. However, commercially available messaging services have not integrated the sharing of image media as a layer or enhancement on top of the typed or other message exchange.

More specifically, the steady proliferation of digital imaging devices such as digital cameras, camera-equipped cellular phones and personal digital assistants has made the sharing of digital images and other media a more and more common online activity. Messaging users who would like to exchange, share and download images from either side of a conversation however have been unable to freely incorporate picture exchange within their communication experience, and certainly not as part of an integrated messaging tool Other problems and disadvantages exist in messaging technology.

SUMMARY OF THE INVENTION

The invention overcoming these and other problems in the art relates in one regard to a system and method for realtime messaging having an image-sharing feature, in which a sender may insert and share digital photographs or other media in a messaging session, such as a typed realtime message exchange. In embodiments, two or more users may operate a messaging client to contact each other, for example via a message server or other communications platform. One or more of the users may invite another user or users to share in an image exchange, using the messaging channel to accept or decline that activity. Once accepted, each participant may be automatically be presented with a set of digital images or other media via a viewer tool or other interface. In embodiments, one user may be granted control over the selection and playing of the images in that viewer, for instance to control the playing of images in a slideshow window. Users may pass control of the commonly viewed viewer tool between each other, or in embodiments control may be shared. In embodiments, participants may view, save, print or otherwise manipulate the images accessible to them via the viewer tool. In embodiments that tool may present remote pointers, notes or other interface elements or annotations on or associated with the images. Out-of-order rendering and other optimizations may be used to enhance response times for participating viewers.

DETAILED DESCRIPTION OF EMBODIMENTS

Figure 1:
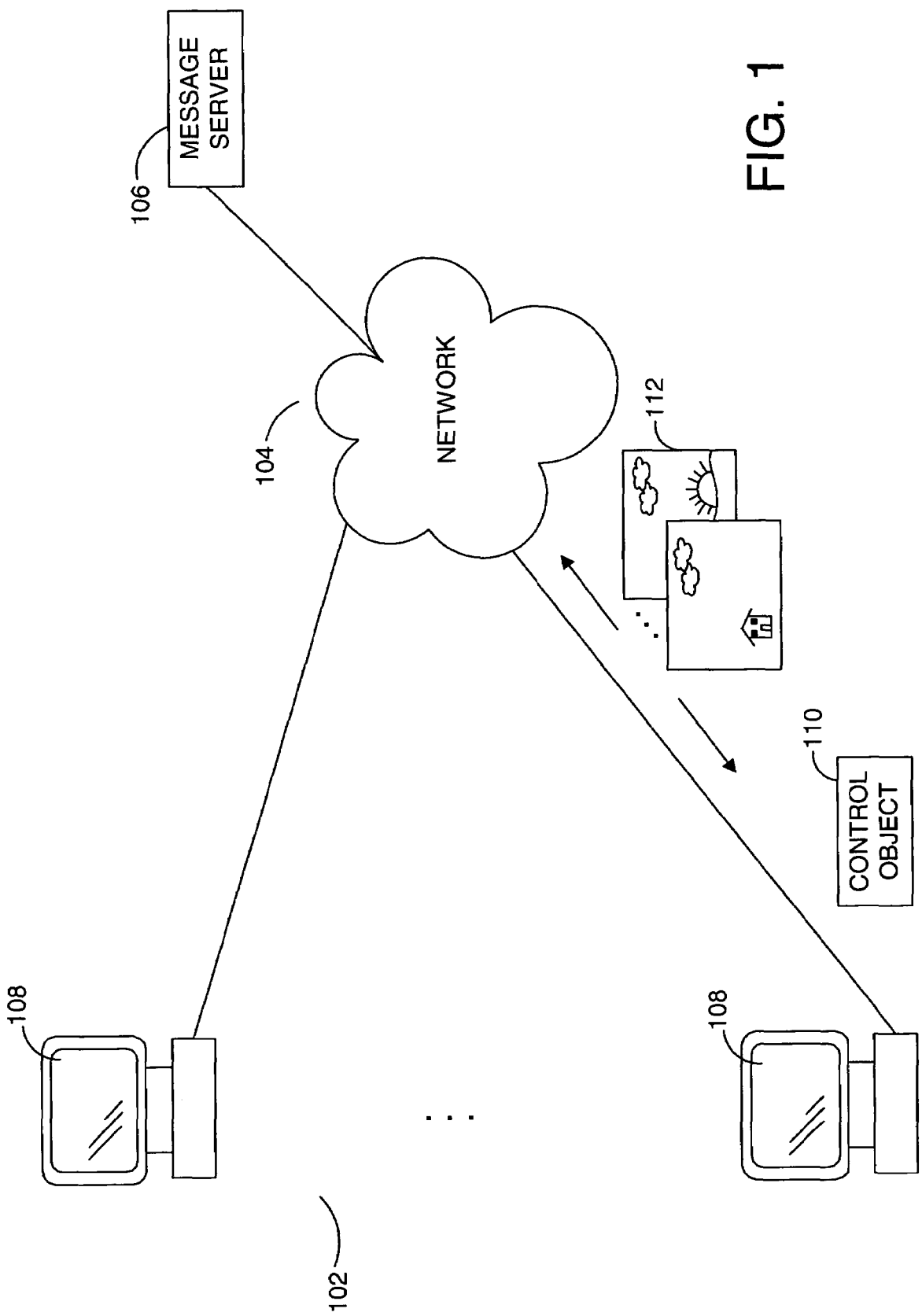
FIG. 1 illustrates a network in which a messaging platform may operate, according to embodiments of the invention.

FIG. 1 illustrates an overall network architecture in which a system and method for realtime messaging may operate, according to an embodiment of the invention. As illustrated in that figure one or more users in a set of users 102 may use personal computers, workstations, personal digital assistants, network-enabled cellular telephones or other clients or devices to communicate with each other via a network 104. Network 104 may be, include or interface to, for example, the Internet, an intranet, a local area network (LAN) or other local or remote network. Those users may execute a messaging client 108, for example a messaging service such as Microsoft Network (MSN) Messenger. In embodiments other available services such as Internet relay chat (IRC), ICQ (I seek you) or others may be used. Other clients, services or channels, using for instance a graphical user interface, command line interface, voice-activated or other interface, may be used to perform or support messaging functions.

More particularly and as shown in FIG. 1, two or more users in the set of users 102 may communicate via network 104 and in embodiments contact a message server 106 to exchange typed, voice or other messaging, for example in a mutually viewed chat panel or other realtime or near-realtime channel. The communication may be carried out on various ports or other interfaces, for instance using transfer control protocol/Internet protocol (TCP/IP), session initiation protocol (SIP), session initiation protocol for instant messaging and presence logical extensions (SIMPLE) or other protocols or resources. According to the invention in one regard, the participating users in the set of users may furthermore share, view and otherwise manipulate a set of shared images 112, such as digital photographs in joint photographic experts group (JPG) or other format.

In embodiments the set of shared images 112 may be transmitted into the realtime communications channel deployed in the invention, directly from one or more client machines from within the set of users 102 in peer-to-peer fashion. In embodiments images or other media may also be accessed or served from remote servers or other storage sites or resources. According to embodiments of the invention, control over the display of the set of shared images 112 may be exercised or maintained by at least one participating user, for instance by passing control object 110 to that user to establish viewing control. In embodiments the control object 110 may be voluntarily exchanged from one of the set of users 102 to another, in baton, round-robin or other fashion. Different control-sharing schemes may be used.

Figure 2:
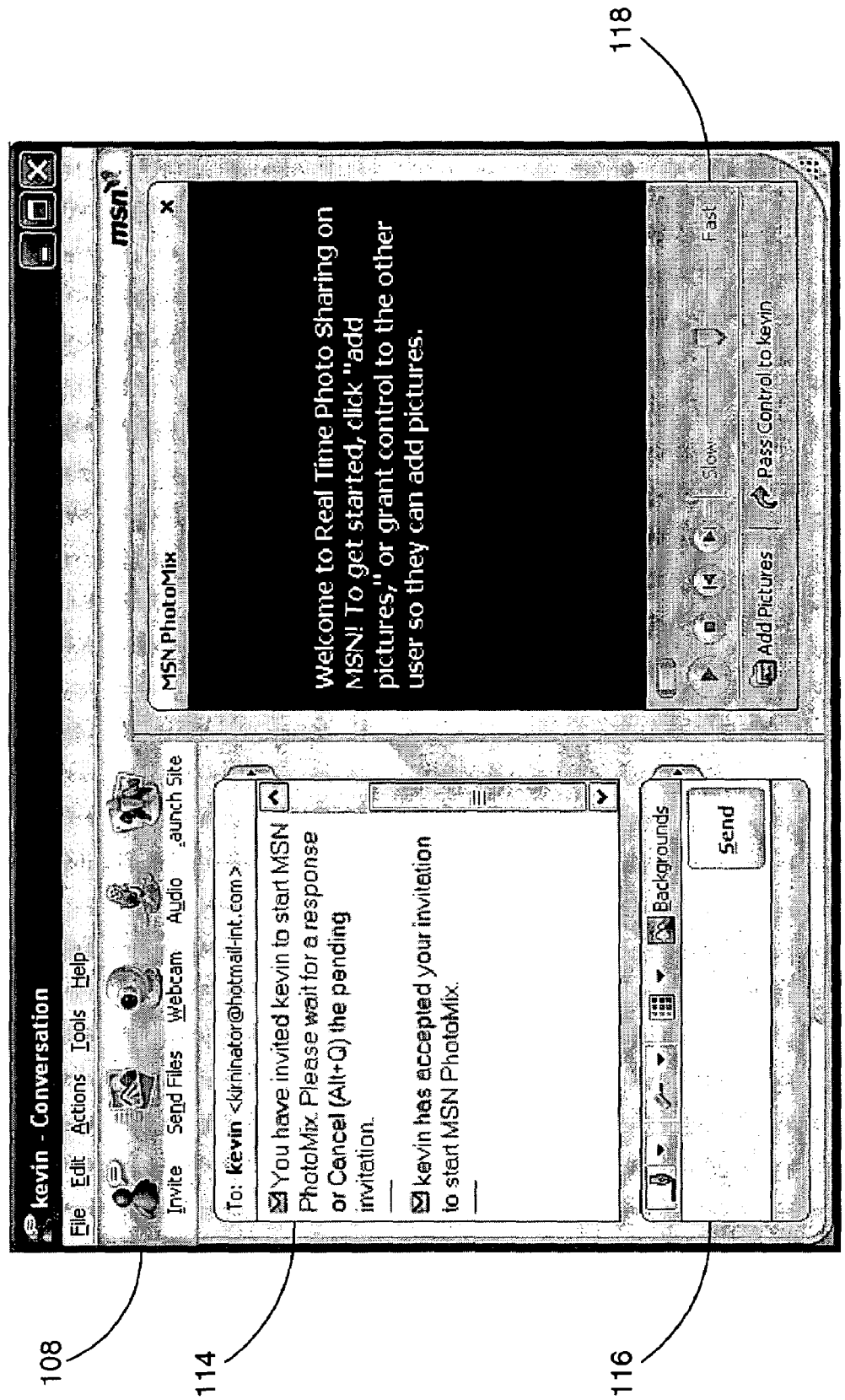
FIG. 2 illustrates a messaging session with an image sharing feature, carried out according to an embodiment of the invention.

As illustrated in FIG. 2, an image-sharing session according to an embodiment of the invention may be initiated via the messaging client 108. That session may be initiated, as illustrated, via a typed message within a dialog tool 114, such as a dynamic window displaying typed messages between users in scrolling or other fashion. As shown one user may invite another user to participate in an image-sharing session in dialog tool 114, which invitation the other user may accept via the dialog tool 114 or other response. Once accepted, a notification may be displayed to the user making the invitation that the invitation has been accepted. Upon acceptance, the messaging client 108 may automatically open a selector tool 116 and viewer 118, to select and mutually display a set of shared images 112 to the participating users in the set of users 102. Again in embodiments, the participating users may be or include two or more users, subscribers or other connected parties.

Once activated, the viewer 118 may prompt the user who initiated the image-sharing session to click or activate the selector tool 116 to insert images into the mutually viewed session, or to pass control to the other one or more participating user. In embodiments the objects picked or selected by selector tool 116 may be or include, for example, digital photographs such as images in JPG, TIFF (tagged image format file) or other formats stored on the initiating user's machine. It will be appreciated that in embodiments other media types may be combined or separately added or manipulated to share, such as video clips, audio samples or others.

After the user having control has selected the images or other media they wish to share, they may click or activate a "Send" button or other interface element in selector tool 116 or otherwise to transmit the set of shared images 112 to the other user. Once sent, the set of shared images 112 may be communicated via network 104 to the other user or users, for instance via message server 106. In embodiments the set of shared images 112 may be communicated between users using different channels or protocols than those supporting the typed messages or other content of dialog tool 114. Other communication architectures are possible.

Figure 3:
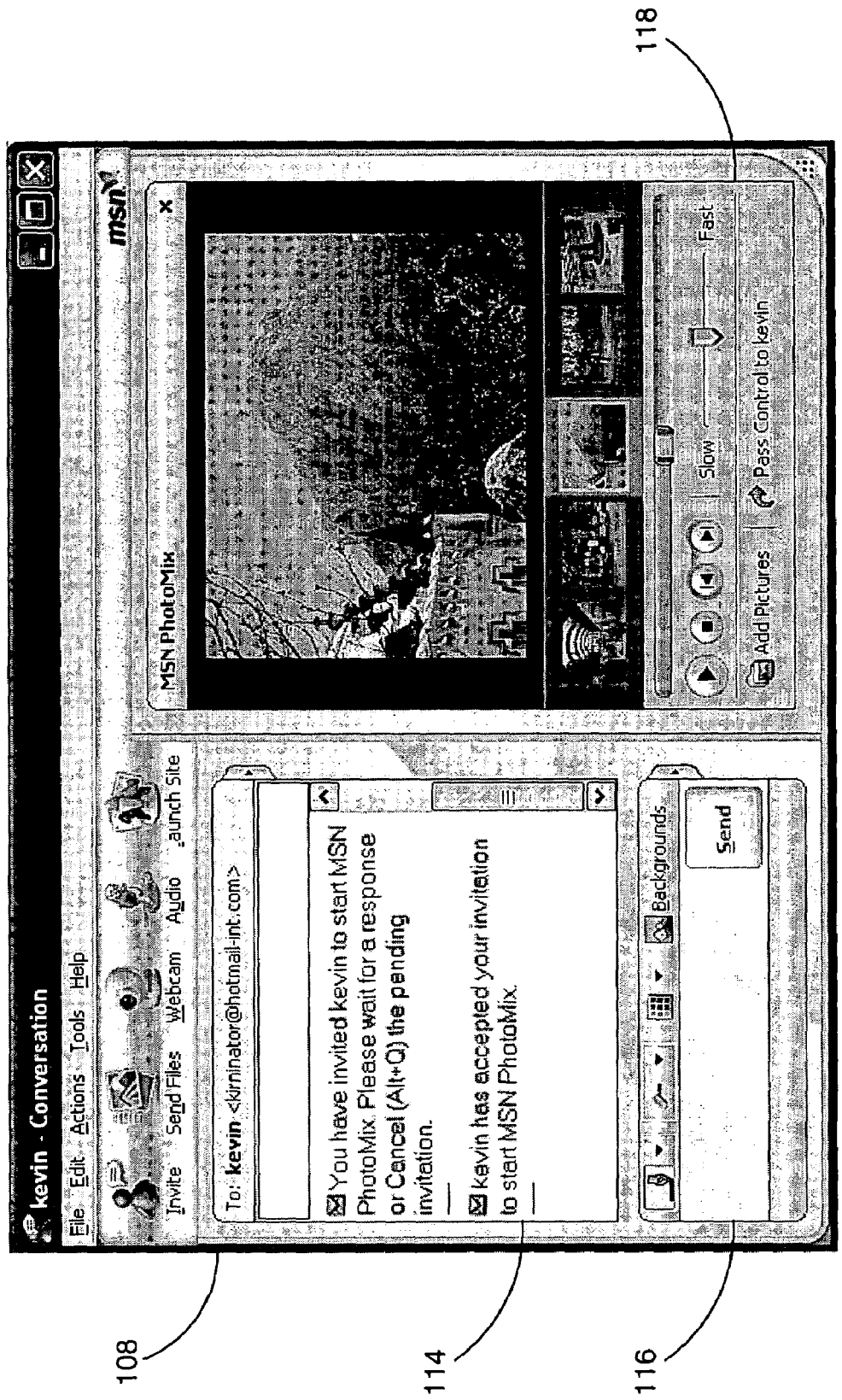
FIG. 3 illustrates a messaging session with an image sharing feature with an illustrative image selected and displayed, according to embodiments of the invention.

As shown in FIG. 3, after the set of shared images 112 has been sent to the one or more other participating users, the sending user as well as the other participating user or users may then automatically be presented with a rendition of the set of shared images 112 on viewer 118. As illustrated viewer 118 may be or include a slideshow tool, but it will be appreciated that other types or configurations of viewer 118 may be used. The user currently retaining control over the mutually displayed set of shared images 112 on the viewer 118 of participating users may select, play, stop or otherwise manipulate the presentation of the set of shared images 112, using slider and other controls. In embodiments, the user in current control may manipulate remote interface elements on the viewer 118 of the remaining participants, for instance to move a pointer over images, attach notes, stickies or other annotations to images or other media objects, play or insert voice notes or otherwise mark or manipulate the presented set of shared images 112. In embodiments, participating viewers may view, download or print the set of shared images 112 presented on their respective machines. In other embodiments, access or editing rights to the set of shared images 112 may be limited to the user retaining control. Other levels or divisions of access rights to the set of shared images 112 are possible.

Figure 4:
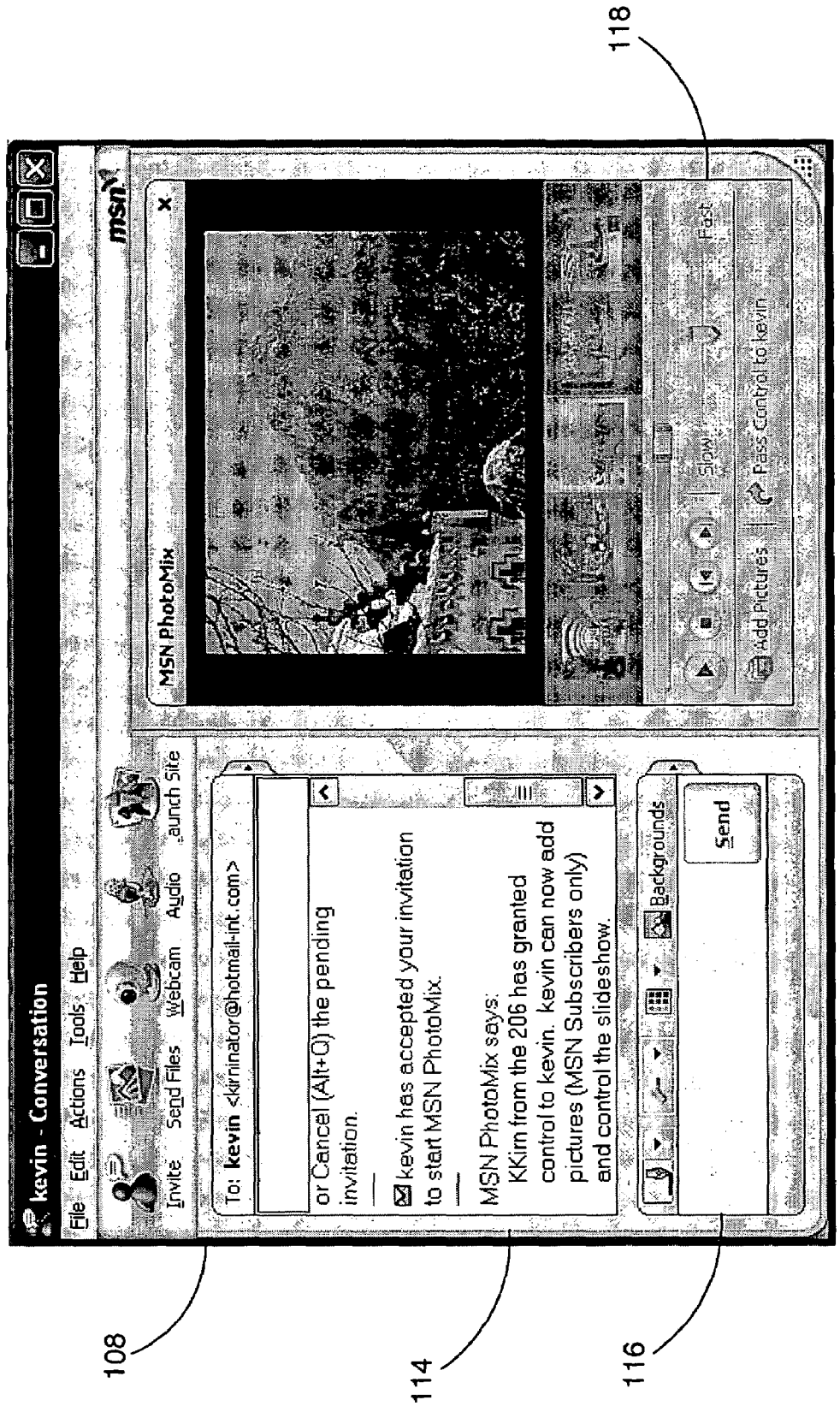
FIG. 4 illustrates a messaging session with control privileges passed to another participant, according to an embodiment of the invention.

In embodiments, that user may elect to pass control of the displayed set of shared images 112, for instance by messages in dialog tool 114 as illustrated in FIG. 4. The recipient may accept possession of control, for instance by receiving control object 110 (FIG. 1), such as a certificate, cookie or other token or object representing or activating control privileges over the set of shared images 112. Once control has passed from one user to another, the user who no longer maintains control may see a grayed-out version of the controls of viewer 118, as shown in that figure, signifying that the other remote user or users now retain control of the realtime presentation of the set of shared images 112.

In embodiments, particularly involving a group of more than two participants, one or more users may choose an option to "follow" another selected user, that is to view whatever set of shared images 112 that other user is actively viewing. In embodiments in which more than two users are actively participating, two or more users may in implementations select an option to remain synchronized with each other, constantly viewing the same set of shared images 112, independently of selections by other participating users. In further embodiments, one or more users may choose to "wander" or disengage from the current set of shared images 112 mutually viewed by participants, in which case that user may elect to reenter the messaging session at a later point. In embodiments involving a group of more than two participants, more than one control object 110 may be distributed to the set of users 102, a common control channel may be established in the background, or other control and arbitration mechanisms may be used. In such embodiments the exact set of shared images 112 currently loaded or viewed in each viewer 118 may be tracked to maintain consistency. Other viewing and control combinations are possible.

Figure 5:
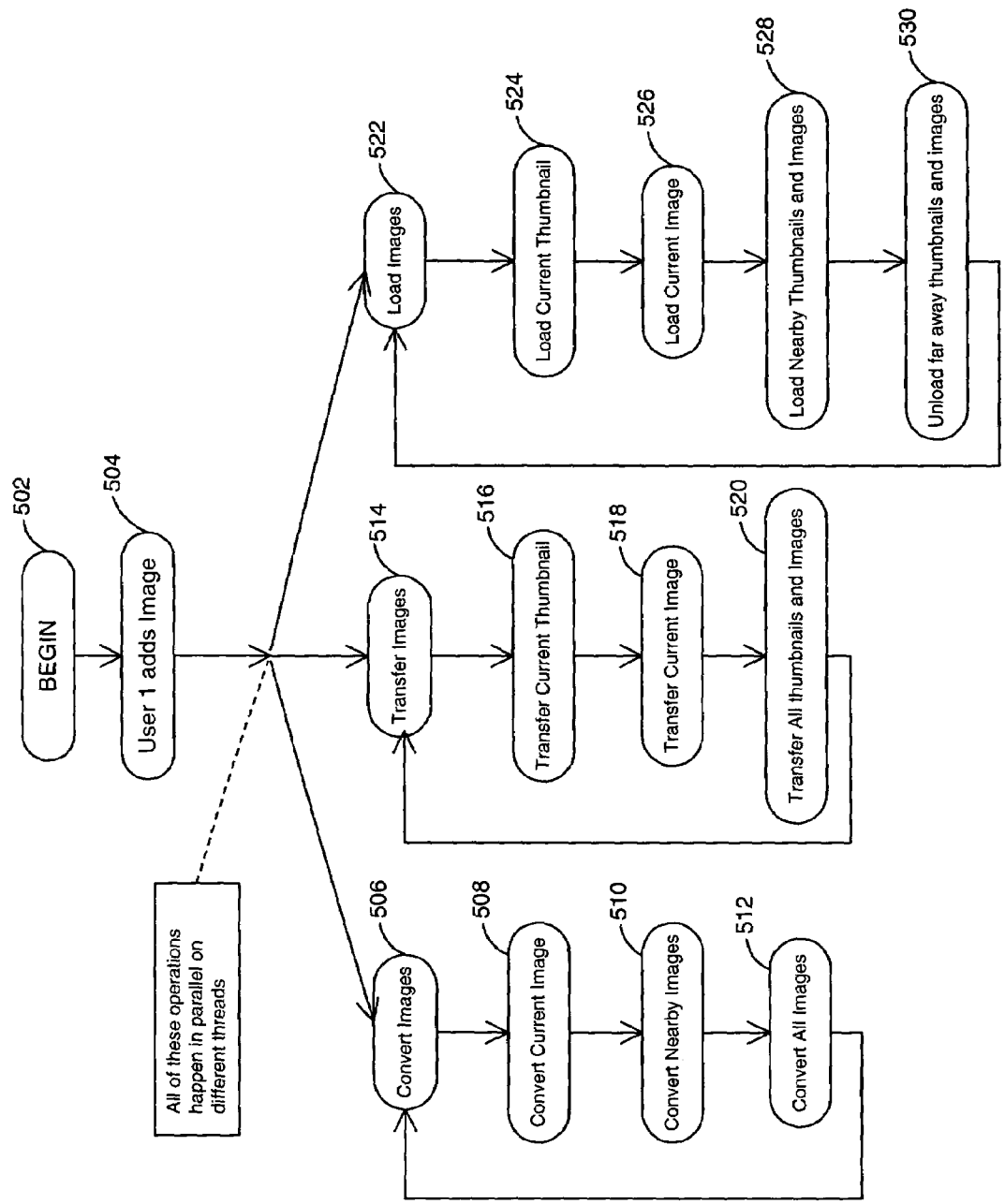
FIG. 5 illustrates a flowchart of overall image sharing and message processing, according to an embodiment of the invention.

Overall messaging processing according to an embodiment of the invention is illustrated in FIG. 5. In step 502, processing may begin. In step 504, the user or users having control of viewer 118 or others may select and add an image to the set of shared images 112, for instance using selector tool 116. Following step 504, more than one branch of independent or concurrent image and communications processing may follow, for instance by parallel execution of different threads on one or more machine. In step 506, a branch of executing image conversion may be initiated. In step 508, one or more image currently selected for or inserted into the set of shared images 112 may be converted, for instance from original file format, such as JPG, to another. Similarly the image may be converted in layout size, color depth or other parameters, for instance to generate a thumbnail-sized representation of the selected image. In step 510, a nearby or successive image in a sequence of images (such as in a slide show) may be converted from one format, size, color depth or other parameter to another, for instance to facilitate transmission and viewing in the viewer 118 of remote users. In step 512, all images, including for instance those which are farther away in a slideshow, film strip or other sequence, may be conditioned or converted for shared operations. Processing may then repeat, return to step 506 or other prior processing point or terminate.

In step 514, a branch of image transfer processing may be initiated. In step 516, a thumbnail or other converted representation of a currently selected image may be transferred from the transmitting user to the one or more other users participating in the messaging and viewing session, for instance via network 104 and message server 106, or otherwise. In step 518, the image itself (whose thumbnail representation was transmitted) may likewise be transferred or transmitted to participating users. In step 520, all remaining thumbnail representations of images and underlying images themselves in the set of shared images 112 may be transferred to participating users in the set of users 102, for viewing on viewer 118 or other tools or resources. Processing may then repeat, return to step 514 or other processing point or terminate.

In step 522, a branch of image loading processing may be initiated. In step 524, a current thumbnail of a selected image, instance under control of the initiating user or other user, may be loaded into viewer 118 of one or more participating users. In step 526, the currently selected image in the set of shared images 112 may itself may be loaded into viewer 118 of one or more participating users, for instance in the center of a panel in viewer 118 as illustrated in FIG. 3. In step 528, nearby thumbnail representations and related images, for instance successive images in a slideshow sequence, may be loaded into viewer 118 of participating users. In step 530, far away thumbnails and related images may be unloaded from viewer 118, for instance images in a slideshow sequence which are beyond the current thumbnail selection strip. Processing may then repeat, return to step 522 or other prior processing point or terminate.

The foregoing description of the invention is illustrative, and modifications in configuration and implementation will occur to persons skilled in the art. For instance, while the invention has generally been described in terms of one or more message sessions which share representations of stored images from one or more user's local machine, in embodiments other media, such as audio clips, streamed video or other types or combinations of types of media may be incorporated. Likewise in embodiments the shared images or other media may be selected or obtained from additional or other sources, such as remote media servers or other resources, in client/server or hybrid peer/server fashion.

Similarly, while the invention has in embodiments been described as presenting chat-style messages which reference and display the shared images or other media objects, in embodiments other types or formats of messaging may be included or also used, such as voice-channel connections or others. Other hardware, software or other resources described as singular may in embodiments be distributed, and similarly in embodiments resources described as distributed may be combined. The scope of the invention is accordingly intended to be limited only by the following claims.

We claim:

1. A computer-implemented messaging system, comprising:
   a messaging client for presenting a dialog interface to a plurality of users;
   a media viewer, communicating with the messaging client, the media viewer selectively presenting a set of shared media objects selected by at least one user with control of an image-sharing session to at least one user without control of the image-sharing session, wherein the media viewer is configured to assign two or more control objects to two or more users of the plurality of users, wherein each of the two or more control objects is at least one of a certificate, cookie, or token and is transmissible to another user of the plurality of users such that, upon receipt of one of the two or more objects, a receiving user is permitted to:
   (1) control the display of each of the media objects in the set of shared media objects, and
   (2) manipulate remote interface elements on one or more media viewers presented to one or more users without one of the two or more control objects;
   a presentation engine component in the media viewer for presenting all of the media objects within the set of shared media objects to the at least one user without control by parallel execution of independent image-processing operations to:
   (1) convert at least one media object into a thumbnail-sized representation of the at least one media object for viewing by the at least one user without control,
   (2) transfer all of the media objects within the set of shared media objects and the thumbnail-sized representation to the at least one user without control, and
   (3) load all of the media objects within the set of shared media objects and the thumbnail-sized representation to be viewed by the at least one user without control.

2. A system according to claim 1, wherein the messaging client comprises a network-enabled chat client.

3. A system according to claim 2, wherein the dialog interface comprises at least a mutually viewed chat window presenting typed messages.

4. A system according to claim 1, wherein the set of shared media objects comprises at least a set of graphical images.

5. A system according to claim 4, wherein the set of graphical images comprises a set of digital photographs.

6. A system according to claim 1, wherein at least one of the users maintains control of the set of shared media objects selectively presented on the media viewer via a transmissible control object, which may be passed to or shared by other users.

7. A system according to claim 1, further comprising a selector tool, communicating with the messaging client, the selector tool presenting a set of media objects to select for mutual viewing by the users.

8. A system according to claim 1, wherein the media viewer is integrated with the messaging client.

9. A system according to claim 1, wherein the media viewer is separate from the messaging client.

10. A system according to claim 1, wherein the set of shared media objects comprises at least one of an audio sample and a video clip.

11. A system according to claim 1, further comprising at least one annotation object presented via the media viewer.

12. A system according to claim 11, wherein the at least one annotation object comprises at least one of a sticker object and a pointer, the at least one annotation object being controlled by the at least one user maintaining control.

13. A system according to claim 1, wherein at least two of the users share control of presentation of the set of shared media objects.

14. A system according to claim 1, further comprising an option to independently select a set of shared media objects to view in the media viewer.

15. A system according to claim 1, wherein the media viewer comprises an optimized loader, the optimized loader selectively loading media objects in the set of shared media objects to increase response time.

16. A system according to claim 1, wherein the media viewer comprises a slideshow tool.

17. A communications method, comprising:
   presenting a dialog interface to a plurality of users via a messaging client;
   selectively presenting, in peer-to-peer fashion, a set of shared media objects selected by at least one user with control of an image-sharing session to at least one user without control of the image-sharing session by parallel execution of independent image-processing operations to:
   (1) convert at least one media object into a thumbnail-sized representation of the at least one media object for viewing by the at least one user without control, transfer all of the media objects within the set of shared media objects and the thumbnail-sized representation to the at least one user without control, and (2) load all of the media objects within the set of shared media objects and the thumbnail-sized representation to be viewed by the at least one user without control; and assigning two or more control objects to two or more users of the plurality of users, wherein each of the two or more control objects is at least one of a certificate, cookie, or token and is transmissible to another user of the plurality of users such that, upon receipt of one of the two or more objects, a receiving user is permitted to:

(1) control the display of each of the media objects in the set of shared media objects, and (2) manipulate remote interface elements on one or more media viewers presented to one or more users without one of the two or more control objects; and on the media viewer being presented to a user who transmitted any of the two or more control objects, graying-out one or more media-viewer controls.

18. A method according to claim 17, wherein the messaging client comprises a network-enabled chat client.

19. A method according to claim 18, wherein the dialog interface comprises at least a mutually viewed chat window presenting typed messages.

20. A method according to claim 17, wherein the set of shared media objects comprises at least a set of graphical images.

21. A method according to claim 20, wherein the set of graphical images comprises a set of digital photographs.

22. A method according to claim 17, wherein at least one of the users maintains control of the set of shared media objects selectively presented on a media viewer via a transmissible control object.

23. A method according to claim 17, further comprising a step of presenting a set of media objects via a selector tool to select for mutual viewing by the users.

24. A method according to claim 17, wherein the set of media objects is presented via a media viewer integrated with the messaging client.

25. A method according to claim 17, wherein the set of media objects is presented via a media viewer is separate from the messaging client.

26. A method according to claim 17, further comprising a step of presenting at least one annotation object via the media viewer.

27. A method according to claim 17, wherein at least two of the users share control of presentation of the set of shared media objects.

28. A method according to claim 17, further comprising presentation of an option to independently select a set of shared media objects to view in the media viewer.

29. A method according to claim 17, wherein at least any two of the users may select a set of shared media objects to synchronously view, independently of other users.

30. A method according to claim 17, further comprising a step of executing an optimized loader, the optimized loader selectively loading media objects in the set of shared media objects to increase response time.

31. A method for sharing media objects, the method comprising:

presenting a dialog interface to at least two users via a messaging client;

executing a selector tool, the selector tool selecting a set of media objects specified by at least one user with control of an image-sharing session to share with at least one user without control of the image-sharing session; and presenting all of the media objects within the set of media objects to the at least one user without control by executing independent image-processing operations in parallel to:

(1) convert at least one media object into a thumbnail-sized representation of the at least one media object for viewing by the at least one user without control, (2) transfer all of the media objects within the set of shared media objects and the thumbnail-sized representation to the at least one user without control, and ((3) load all of the media objects within the set of shared media objects and the thumbnail-sized representation to be viewed by the at least one user without control; and transmitting a control object from the at least one user with control to the at least one user without control, and after the transmission:

(1) allowing the user that received the control object to manipulate remote interface elements presented to the user that transmitted the control object, and (2) graying-out one of more controls presented to the user that transmitted the control object.

32. The method of claim 31, wherein the messaging client comprises a network-enabled chat client.

33. The method of claim 31, wherein the dialog interface comprises at least a mutually viewed chat window presenting typed messages.

34. The method of claim 31, wherein the set of shared media objects comprises at least a set of graphical images.

35. The method of claim 34, wherein the set of graphical images comprises a set of digital photographs.

36. The method of claim 31, wherein at least one of the users maintains control of the set of shared media objects selectively presented on a media viewer via a transmissible control object.

37. The method of claim 31, wherein the selector tool is integrated with the messaging client.

38. The method of claim 31, wherein the selector tool is separate from the messaging client.

* * * * *

UNITED STATES PATENT AND TRADEMARK OFFICE
CERTIFICATE OF CORRECTION

| | | |
|---|---|---|
| PATENT NO. | : 7,458,030 B2 | Page 1 of 1 |
| APPLICATION NO. | : 10/733763 | |
| DATED | : November 25, 2008 | |
| INVENTOR(S) | : Kevin Neil Kirn et al. | |

It is certified that error appears in the above-identified patent and that said Letters Patent is hereby corrected as shown below:

In column 8, line 26, in Claim 31, delete "((3)" and insert -- (3) --, therefor.

Signed and Sealed this
Tenth Day of May, 2011

David J. Kappos
*Director of the United States Patent and Trademark Office*